United States Patent [19]

Butte

[11] Patent Number: 5,688,045

[45] Date of Patent: Nov. 18, 1997

[54] WHISK HANDLE WITH MOLDED PLASTIC COATING

[75] Inventor: Patrick Butte, Lyons, France

[73] Assignee: Societe des Etablissements Combrichon, France

[21] Appl. No.: 677,547

[22] Filed: Jul. 18, 1996

[51] Int. Cl.⁶ .................................................. A47J 43/10
[52] U.S. Cl. ............................................................ 366/129
[58] Field of Search ............................... 366/129, 130, 366/342, 343; 416/69, 70, 231 A, 227 R; 15/141.1, 143.1; 99/348

[56] References Cited

U.S. PATENT DOCUMENTS

| | | | |
|---|---|---|---|
| 567,684 | 9/1896 | Moody | 416/70 |
| 837,750 | 12/1906 | Sturma | 416/227 X |
| 866,909 | 9/1907 | Brenner | 416/70 |
| 871,247 | 11/1907 | Tomlinson | 416/70 |
| 884,085 | 4/1908 | Genge | 416/70 |
| 1,210,192 | 12/1916 | Moses | 366/129 X |
| 1,410,522 | 3/1922 | Ziemba | 366/129 X |
| 1,722,187 | 7/1929 | Wetzel | 416/227 |
| 2,140,716 | 12/1938 | Latshaw | 366/129 X |
| 2,499,074 | 2/1950 | Nordgarden | 366/129 X |
| 3,412,983 | 11/1968 | Kesilman et al. | 416/70 |

FOREIGN PATENT DOCUMENTS

| | | |
|---|---|---|
| 0216234 | 4/1987 | European Pat. Off. . |
| 0600812 | 6/1994 | European Pat. Off. . |
| 2646765 | 11/1990 | France . |
| 8704900 | 7/1987 | Germany . |
| 8713911 | 1/1988 | Germany . |
| 181998 | 1/1936 | Switzerland . |
| 362197 | 7/1962 | Switzerland . |

OTHER PUBLICATIONS

Database WPI, Week 7918, Derwent Publications Ltd., JP 54-038368.

*Primary Examiner*—Charles E. Cooley
*Attorney, Agent, or Firm*—Parkhurst, Wendel & Burr, L.L.P.

[57] ABSTRACT

A whisk with a plurality of loops (3) at one end thereof having a hollow handle body (1) flaring toward the loops (3), and receiving in the flared region a correspondingly shaped insert (2) which can be rigidly joined to said body, said insert cooperating with the body (1) to ensure tight affixation of loops (3). The body (1)-insert (2) assembly including affixed loops (3) is covered by a peripheral plastic layer (6).

25 Claims, 1 Drawing Sheet

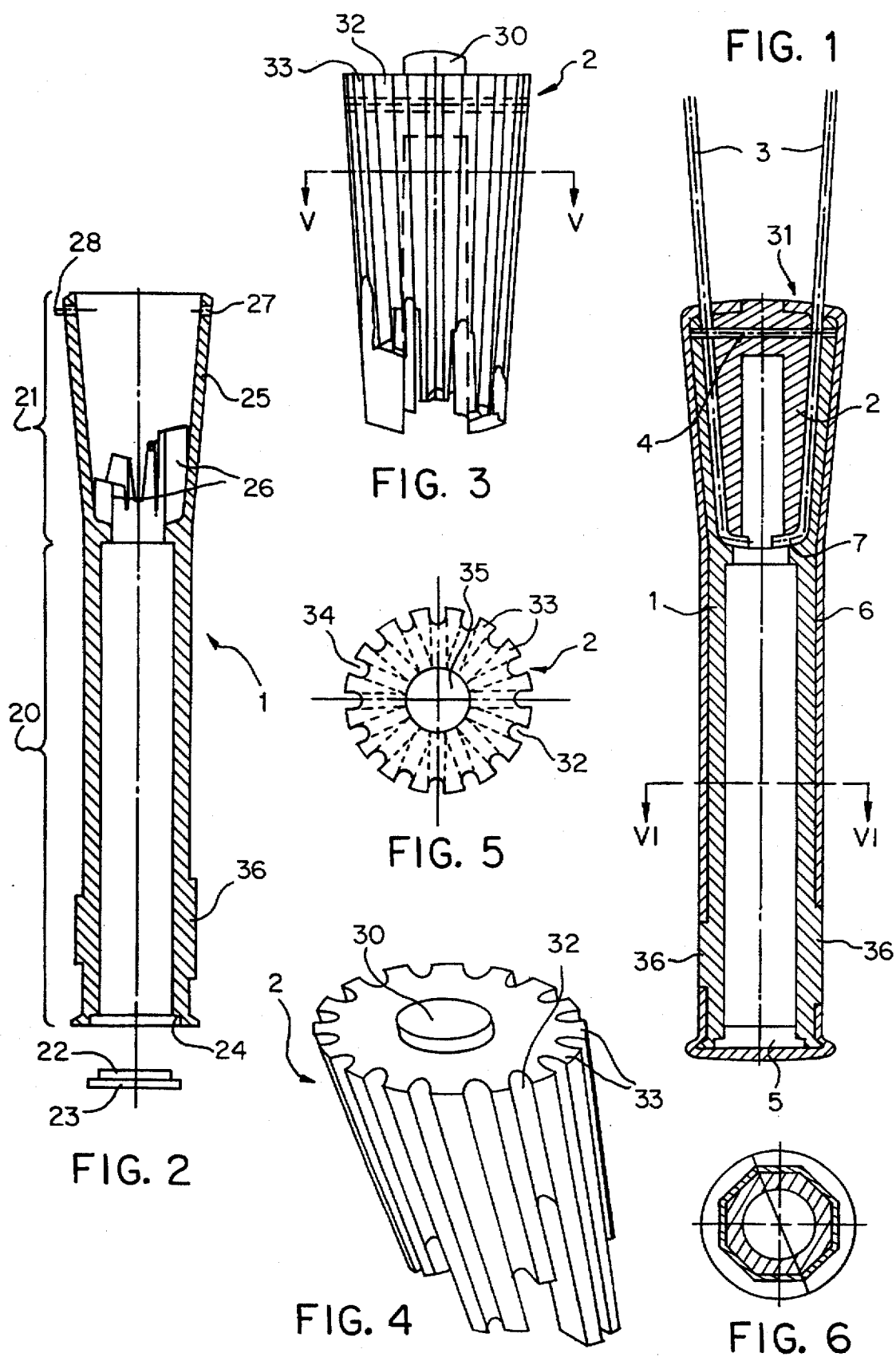

WHISK HANDLE WITH MOLDED PLASTIC COATING

The present invention concerns a new handle for a culinary whisk.

As is known, a culinary whisk is a utensil with a plurality of rigid metallic wires of which all the ends are joined to a handle. A whisk is used to whip or mix culinary preparations, in particular sauces.

BACKGROUND OF THE INVENTION

In well known manner, culinary whisks are fitted with handles composed of wood or metal tubing. When in contact with liquids, especially during washing, the wood of the handle tends to degrade, even rot. There are also plastic handles that present the double inconvenience of being heavy and of transmitting heat thereby burning the hand when used over a long time.

Also on the market are whisks having hollow handle bodies made of stainless or non-stainless steel, and to which the metal loops are affixed by welding. Unfortunately the sealing is frequently compromised where the wires enter the handle and at the opposite end of said handle, allowing ingredients to penetrate into the handle body. The consequence of this introduction translates into unacceptable bacterial proliferation incompatible with hygiene regulations.

In general, whisk handles are cylindrical or evince symmetry of revolution so that, in the presence of fatty substances, gripping the handle is made more difficult.

SUMMARY OF THE INVENTION

It is therefore an object of the invention is to overcome these various drawbacks.

The invention concerns a kitchen whisk handle comprising at one of its ends a plurality of loops constituting the whisk proper.

The handle of the whisk is composed of a hollow handle body flaring in the direction of the loops, and receives in this flared region a correspondingly shaped insert affixable thereto. The insert cooperates with the body to assure that the loops are tightly fastened.

following loop emplacement and affixation of the insert into the body, the body insert assembly receives a peripheral layer of plastic.

In other words, the handle is hollow and flared at one of its ends. In the flaring cavity so defined, the handle receives a frustoconical piece of slightly lesser dimensions. The whisk loops, in particular metal loops, are maintained in the space between the insert and the interior of the cavity of the body. Thereupon the assembly is over-molded, thereby guaranteeing good sealing at the junction zone of the metal loops and the handle.

Advantageously, the insert is affixed to the body of the handle by a diametric pin located at the end of the handle.

In a practical embodiment, the frustoconical insert comprises a set of grooves running along an outer surface of the frustaconical piece defining frustrate-of-cone generatrices, and for receiving metal loops. The grooves are regularly distributed over the periphery of said frustrum-of-cone, are stepped in length, and are symmetrical relative to the handle axis. Their ends cooperate with projecting blades, fired at the bottom of the flaring cavity of the body of the handle for locking in place, in cooperation with each lower end of said grooves, the bent-around ends of the metal loops, said blades evincing stepped lengths, symmetrical to the handle axis, and of a length complementary to that of the grooves with which they cooperate.

In other words, the metal loops are located in planes which all intersect the axis of revolution of the handle. Because of the metal wire thickness, the tips of the loops, forming the end of the whisk, are offset relative to the handle axis. The loop ends are received in the grooves of the insert. In order to employ identical loops, one of the objects of the invention is to provide to the grooves different lengths depending on offset caused by the superposition of the loops. The loop ends are locked in place in the grooves by a set of blades jointly molded with the body of the handle. Accordingly, these blades evince corresponding stepped heights, and cooperate with the corresponding and complementary grooves of the insert, in order to lock the ends of said loops.

Because the handle is hollow, its weight is reduced thereby allowing the whisk to float.

Preferably, the handle is made of polyolefin and in particular of polypropylene.

Preferably the handle cross-section is polygonal, in particular octagonal, thereby faciliating gripping and preventing the handle from rotating in the hand. The handle cross-section flares at the side of the metal loops to prevent the handle from slipping along its axis. This shape perfectly matches the hand's anatomy, when the handle is gripped between the thumb and the index finger, underscoring the ergonomic characteristic of the handle hereby realized.

BRIEF DESCRIPTION OF THE DRAWINGS

The implementation of the invention and the consequent advantages are elucidated in the illustrative embodiment discussed below in non-limiting manner in relation to the drawings.

FIG. 1 is a longitudinal section of the full handle.

FIG. 2 is a longitudinal section of the body of the handle.

FIG. 3 is a longitudinal view of the insert.

FIG. 4 is a schematic perspective of the insert.

FIG. 5 is a cross-sectional view of the insert, along line V—V of FIG. 3.

FIG. 6 is a cross-section view of the handle along line VI—VI of FIG. 1.

DETAILED DESCRIPTION OF THE INVENTION

As shown in FIG. 1, the whisk handle is composed of a hollow handle body 1, into which is inserted an insert 2 which, in cooperation with the handle body 1 keeps in place the metal loops 3 constituting the actual whisk. The insert 2 is affixed to the handle by a pin 4. The free end of the handle is sealed by a stopper 5 and the handle body insert assembly 1, 2 is over-molded, such that an outer coat 6 provides an impermeable seal, in particular against liquids.

The body 1 of the handle, as shown in FIG. 2, comprises two main parts. The first part 20 is long and straight, and the second part 21 is hollow and frustoconical and constitutes the affixation zone for the metal loops 3. However, the overall shape imparted to the handle is meant to facilitate gripping the handle, and to allow its use without muscle tensing, by avoiding hand slippage in the direction of the whisk. In this manner, besides its actual function, the handle of the invention also is ergonomically significant and thus boosts its usefulness.

The long part 20 is hollow for lightening the whisk, and consequently, it is able to float when in a liquid. The cavity is sealed by a stopper 5, composed of two superposed cylinders, of which the narrower (22) enters the body of the handle, whereas the wider (23) is locked in place by an offset 24 present for that purpose at the free end of the handle.

The handle cross-section is octagonal, as can be observed in FIG. 6. The main advantage of this configuration is to allow proper gripping while avoiding rotation of the handle in the hand if the hand is wet or greasy.

The flared portion 21 of the body of the handle 1 is meant to receive the insert 2 to keep the metal loops 3 in place between the cone 25 and said insert 2. This flared portion consists of a frustum-of-cone 25 with an angle of a few degrees and of blades 26 running radially relative to the base of this flared portion, toward the axis of revolution of the body of the handle 1. These blades 26 cooperate with the insert 2 to lock in place the ends 7 of the metal loops 3. Two diametrically opposite orifices 27, 28 are present near the end of the frustrum-of-cone 25 to house a pin 4 affixing the insert 2 onto the body of the handle 1.

The insert 2 shown in FIG. 3, evinces a generally frustoconical shape. At the large conical cross-section, the insert 2 comprises a central cylinder 30, to keep the insert 2 in place and consequently, also the body of handle 1, during over-molding. Moreover, its flared end cooperates the with plastic layer 6 put in place by over-molding, to endow the handle with a convex, domed shape where the whisk-constituting wires 3 issue, thereby enhancing the flow and evacuation of the washing liquid in this vicinity and hence, enhancing anti-bacterial action.

On its periphery the insert 2 comprises a set of regularly spaced grooves 32 running along generatrices of the frustrum-of-cone. These grooves 32 receive the lower part of the metal loops 3. The grooves which are diametrically opposite (32, 34) are also of the same length. All pairs of grooves are of different lengths, the smallest gap between two lengths essentially corresponding to the thickness of the metal wire constituting the loops 3. Thus, in order to use identical loops 3, the offset caused by loop superposition is accomplished by insert 2.

The end of the lower portion of the loops 3 terminates into a hook 7, bent back at the end of the groove to prevent the corresponding wire from being torn out. When the loops are each in their respective grooves, the insert-loops assembly is moved into the flared portion 21 of the body of the handle, and the periphery 33 of the insert cone as well as the loops thereby come to press against the inside surface of the cone 21. Furthermore, entry of the insert 2 into the core of the zone 21 is limited by molded blades 26 located at the bottom of the flared zone 21. These blades 26 run radially from the inside surface of the wall defining the zone 21. They are designed to cooperate with the ends of the grooves 32, in a manner to ensure that the hook 7 of each metal loop 3 is locked in place, thereby precluding the danger of these loops being torn out or rotating about themselves. Said blades are of different heights, in order to tightly cooperate with the grooves which also are of different lengths, the highest blades cooperating with the shortest flutings and vice-versa.

The central part of the insert 2 is hollow to allow bending back the ends 7 of the loops 3. The hollow cylinder also is useful when injection-molding the insert.

After all the components have been assembled, over-molding is carried out, for instance using a slightly flexible polyethylene, such as the one commercially known as Kraton® made by Multibase, as a result of which an impermeable seal is formed around the handle. The mold evinces a convex, domed surface where the loops issue (31), and thereby, as already mentioned the utensil may be easily cleaned.

As shown in FIG. 2, two protrusions 36 are present on the body of the handle 1 away from the flared region 21. These two protrusions are flush with the handle periphery following over-molding. In other words, the projecting height they cause substantially corresponds to the thickness of the plastic, surface-molded layer 6. During over-molding, the body of the handle and the insert keeping the loops in place are moved into an over-molding mold. The main function of the protrusions 36 is to assure centering the handle body 1 in the mold. Moreover, the rise of these protrusions constitutes a zone within which a sign or logo may be affixed.

It follows from the above description that the invention offers many advantages in particular relating to sanitation, because of the perfect sealing achieved by over-molding. Moreover the novel design of the insert allows using a single kind of loop and thereby manufacture of the whole whisk is made easier. Notice also should be taken that lightweight materials are used and that ergonomic shapes are offered which impart reliable comfort to the user. This comfort is further enhanced by the slightly flexible material used for over-molding at the handle, thus avoiding any tetanization during use.

I claim:

1. A whisk, comprising:
   a hollow handle having a flared portion at one end thereof, a bottom of the flared portion having stepped blades projecting from inner walls of the flared portion;
   a frustoconical insert having a shape corresponding to the flared portion, cooperating therewith, and being rigidly affixable thereto, said insert further having a plurality of grooves regularly distributed on an outer surface and parallel to a longitudinal axis thereof, said grooves having stepped lengths symmetric to a longitudinal axis of said handle and cooperating with the stepped blades;
   metal loops extending from the flared portion and disposed in the grooves of the insert and along the inner walls of the flared portion, said loops being affixed by bent portions at ends thereof disposed between the cooperating projecting blades and stepped lengths of the grooves; and
   a peripheral layer of plastic coated on said handle and insert.

2. The whisk of claim 1, further comprising a pin for securing said insert to said handle.

3. The whisk of claim 2, wherein said handle and said insert comprise polyolefin.

4. The whisk of claim 2, wherein said peripheral plastic layer comprises polypropylene molded on said handle and insert.

5. The whisk of claim 2, wherein a surface of said insert through which said loops penetrate is domed.

6. The whisk of claim 2, wherein said handle has a polygonal cross section.

7. The whisk of claim 2, wherein said handle has an octagonal cross section.

8. The whisk of claim 1, wherein said handle and said insert comprise polyolefin.

9. The whisk of claim 8, wherein the polyolefin is polypropylene.

10. The whisk of claim 9, wherein a surface of said insert through which said loops penetrate is domed.

11. The whisk of claim 9, wherein said handle has a polygonal cross section.

12. The whisk of claim 9, wherein said handle has an octagonal cross section.

13. The whisk of claim 8, wherein said peripheral plastic layer comprises polypropylene molded on said handle and insert.

14. The whisk of claim 13, wherein said handle has a polygonal cross section.

15. The whisk of claim 8, wherein a surface of said insert through which said loops penetrate is domed.

16. The whisk of claim 8, wherein said handle has a polygonal cross section.

17. The whisk of claim 8, wherein said handle has an octagonal cross section.

18. The whisk of claim 1, wherein said peripheral plastic layer comprises polypropylene molded on said handle and insert.

19. The whisk of claim 18, wherein a surface of said insert through which said loops penetrate is domed.

20. The whisk of claim 18, wherein said handle has a polygonal cross section.

21. The whisk of claim 18, wherein said handle has an octagonal cross section.

22. The whisk of claim 1, wherein a surface of said insert through which said loops penetrate is domed.

23. The whisk of claim 22, wherein said handle has an octagonal cross section.

24. The whisk of claim 1, wherein said handle has a polygonal cross section.

25. The whisk of claim 1, wherein said handle has an octagonal cross section.

* * * * *